(12) United States Patent
Webb et al.

(10) Patent No.: US 12,423,080 B1
(45) Date of Patent: Sep. 23, 2025

(54) DYNAMIC TEST PUBLICATION FRAMEWORK FOR SOFTWARE DEVELOPMENT

(71) Applicant: UIPCO, LLC, San Antonio, TX (US)

(72) Inventors: William Michael Webb, San Antonio, TX (US); Bryan J. Osterkamp, New Braunfels, TX (US); Shiloh Huff, San Antonio, TX (US); Clay Williams, Boerne, TX (US); Michael Lynn Edwards, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 238 days.

(21) Appl. No.: 17/731,481

(22) Filed: Apr. 28, 2022

(51) Int. Cl.
  *G06F 8/65* (2018.01)
  *G06F 11/3668* (2025.01)

(52) U.S. Cl.
  CPC ............ *G06F 8/65* (2013.01); *G06F 11/3688* (2013.01)

(58) Field of Classification Search
  CPC ............. G06F 11/3664; G06F 11/3688; G06F 9/546
  See application file for complete search history.

(56) References Cited

U.S. PATENT DOCUMENTS

| | | |
|---|---|---|
| 5,634,113 A | 5/1997 | Rusterholz |
| 2006/0005067 A1 | 1/2006 | Llyod |
| 2006/0074838 A1 | 4/2006 | Srivastava |
| 2014/0165043 A1 | 6/2014 | Pasala et al. |
| 2015/0227452 A1 | 8/2015 | Raghavan et al. |
| 2017/0289242 A1* | 10/2017 | Keppel ............... H04L 67/1008 |
| 2020/0007474 A1 | 1/2020 | Zhang et al. |
| 2021/0184995 A1 | 6/2021 | Jones et al. |
| 2021/0232490 A1 | 7/2021 | Mitra |
| 2022/0147438 A1* | 5/2022 | Gadagi ............... G06F 9/45558 |
| 2022/0398133 A1* | 12/2022 | Gaddam ................ G06F 9/541 |
| 2022/0407961 A1 | 12/2022 | Willshire et al. |
| 2023/0297436 A1* | 9/2023 | Palukuri ............... G06F 9/5061 709/201 |

\* cited by examiner

*Primary Examiner* — Duy Khuong T Nguyen
(74) *Attorney, Agent, or Firm* — Potomac Law Group, PLLC; Dannon G. Allbee (57) ABSTRACT

A dynamic test publication framework for software development updates can be used to reliably publish test results. A variety of test tools can be used to design and execute a series of software tests for a given software update. An interface can be used to communicate the tests results to one or more producing components. The producing components can stream test results data objects, which can be stored in a queue. The queue can persistently store the test data objects and dynamically scale so that the dynamic test publication framework as a whole can reliably publish test results. A publisher can iteratively receive the queued test results data objects and publish them to a test evidencing platform. In some implementations, components of the dynamic test publication framework can independently and dynamically scale based the observed state of the dynamic test publication framework and/or the test evidencing platform.

20 Claims, 7 Drawing Sheets

DYNAMIC TEST PUBLICATION FRAMEWORK FOR SOFTWARE DEVELOPMENT

TECHNICAL FIELD

The present disclosure is directed to a dynamic test publication framework for software development updates.

BACKGROUND

Modern software products are often tasked with keeping pace with fast moving systems, user behavior, or other dynamics. As a result, software updates are pushed frequently to keep up with the pace of software demands. Software updates involve a series of tasks, such as the development of the software update, testing of the developed update, and the execution of the tested update. When an organization implements large-scale software, the pace can present challenges at different phases of the software update cycle. Software testing and communication among the various systems involved with software testing can, at times, cause a bottleneck in the update cycle and reduce the effectiveness of a software product.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to a dynamic test publication framework for software development updates. Modern software product lifecycles include a steady flow of updates. Part of the software update process involves testing developed updates to vet how an update will operate in particular environments, with other types of software, and generally to decrease the likelihood of bugs or other issues. Software testing involves several moving parts and communication among various computing devices. For example, a variety of testing tools are available that can be used to generate and perform a series of tests for any given software update.

In operation, communication among the different computing devices and/or systems involved in the software update process can cause bottlenecks. For example, implementation of a given software update may require a series of successful test results for the given software update. When an organization has a large-scale software implementation of different types of software, each having its own software update lifecycle, communicating test results to the relevant computing systems (e.g., a test evidencing platform) can present bandwidth, processing, and reliability challenges.

A dynamic test publication framework for software development updates can be used to reliably publish test results to the relevant computing systems. For example, a variety of test tools can be used to design and execute a series of software tests for a given software update. In some implementations, adaptors can be configured to convert the test results for a variety of different test tools to a universal format. An interface can be used to communicate the tests results (e.g., in the universal format) to one or more producing components of the test framework. For example, the producing components can produce a stream of test result data objects that are stored in one or more queue(s). The queue(s) can persistently store the test results data objects and dynamically scale so that the dynamic test publication framework as a whole can reliably publish test results even in the presence of certain bottlenecks.

One or more publishers can iteratively receive the queued test results data objects and publish them to a test evidencing platform. In some implementations, actual performance of a software update at the relevant computing systems can be dependent on publication of the test results at the test evidencing platform. Accordingly, efficient test results publication can lead to efficient software update execution.

In some implementations, the dynamic test publication framework can include several cloud components (e.g., producer components, queues, consumer components, publishers) that can independently scale (e.g., scale up or down based the observed state of the dynamic test publication framework, the test evidencing platform, or other systems). Implementations of the dynamic test publication framework can reliably publish large-scale tests results (e.g., using a variety of testing tools) for different software products so that software updates can be efficiently executed.

Conventional systems implement software testing but suffer from significant drawbacks with regard to test results publishing. For example, when computing slowdowns occur (e.g., due to peak load) conventional publishing frameworks fail to scale components of the framework dynamically and independently. As a result, conventional systems fail to provide persistent test results storage and/or highly reliably publishing (when load is high). In addition, conventional testing frameworks often require test results in a specific format, which limits the type of test tool that can be used to design and perform the testing. These drawbacks lead to bottlenecks in communication among the computing systems that implement software updates, unreliable publishing, redundant transactions due to failed attempts, and ultimately lead to a lag in software update execution.

Implementations of the dynamic test publication framework achieve flexible, reliable, robust, and efficient communication among the computing systems that implement software updates to ensure timely software update execution. For example, one or more adaptors can ingest the output from different test tools and convert the relevant test results to a universal format. This flexibility can ensure the best fit test tool is used for test design and performance. In addition, test results data objects can be generated and stored in a persistent queue that dynamically scales to ensure that test results are reliably processed by the framework. In some implementations, components of the framework dynamically scale based on the observed state of the components of the framework or the systems in communication with the framework.

This dynamic scaling ensures that the test publication framework is not overloaded during peak load while also achieves efficient test results processing when computing resources are available. For example, the dynamic test publication framework's queue(s) may begin to grow at a fast rate, however the publishing mechanism (e.g., computing resources at the test evidencing platform) may indicate limited throughput opportunity. In this scenario, the queue size may be dynamically scaled up rather than dynamically scaling up the number of publishing components. Here, scaling up the publishing components of the dynamic test publication framework may be counterproductive while the computing resources at the test evidencing platform are occupied/unavailable.

When the computing resources at the test evidencing platform indicate higher availability (e.g., the rate of successful publishing increases), the number of publishing components of the dynamic test publication framework can be dynamically scaled up. This example scenario ensures that the dynamic test publication framework keeps processing steady (or slows down processing) when the totality of circumstances will generate a bottleneck. For example, test results can be maintained in the persistent queue when a bottleneck occurs rather than overloading other components of the dynamic test publication framework (that are not designed for persistent storage). Implementations dynamically scale storage when presented with limited computing resources and dynamically scale processing throughput when presented with available computing resources to achieve the flexible, reliable, robust, and efficient test results publishing.

The dynamic test publication framework provides a technical solution to the problems posed by conventional systems at least because the framework improves the communication among the involved computing devices. The arrangement of computing systems and data structures described herein overcome the limitations of conventional systems. For example, the dynamic scaling of queue size based on the state of the overall system combined with the dynamic scaling of the computing elements that provide input to and receive output from the queue effectively manages different possible states of the computing devices in communication. When efficient publication is available, the components of the framework can be scaled to efficiently publish test results. When a slowdown occurs due to computing resource limitations, the components of the framework can be dynamically scaled for persistent storage.

Figure 1:
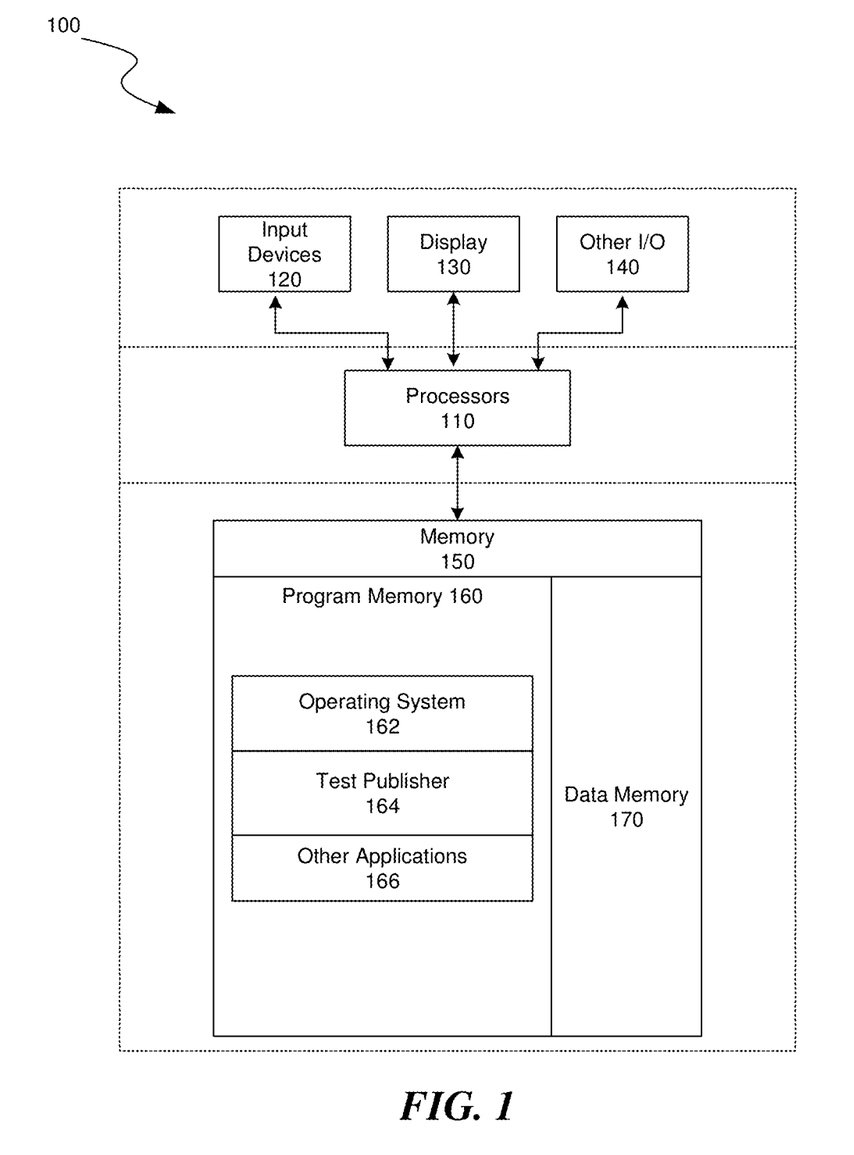
FIG. 1 is a block diagram illustrating an overview of devices on which some implementations can operate.

Several implementations are discussed below in more detail in reference to the figures. FIG. 1 is a block diagram illustrating an overview of devices on which some implementations of the disclosed technology can operate. The devices can comprise hardware components of a device 100 that implement software development updates using dynamic test publishing. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, test publisher 164, and other application programs 166. Memory 150 can also include data memory 170, e.g., test results, monitored state data, historic monitored state data, rules, algorithms, trained machine learning models, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
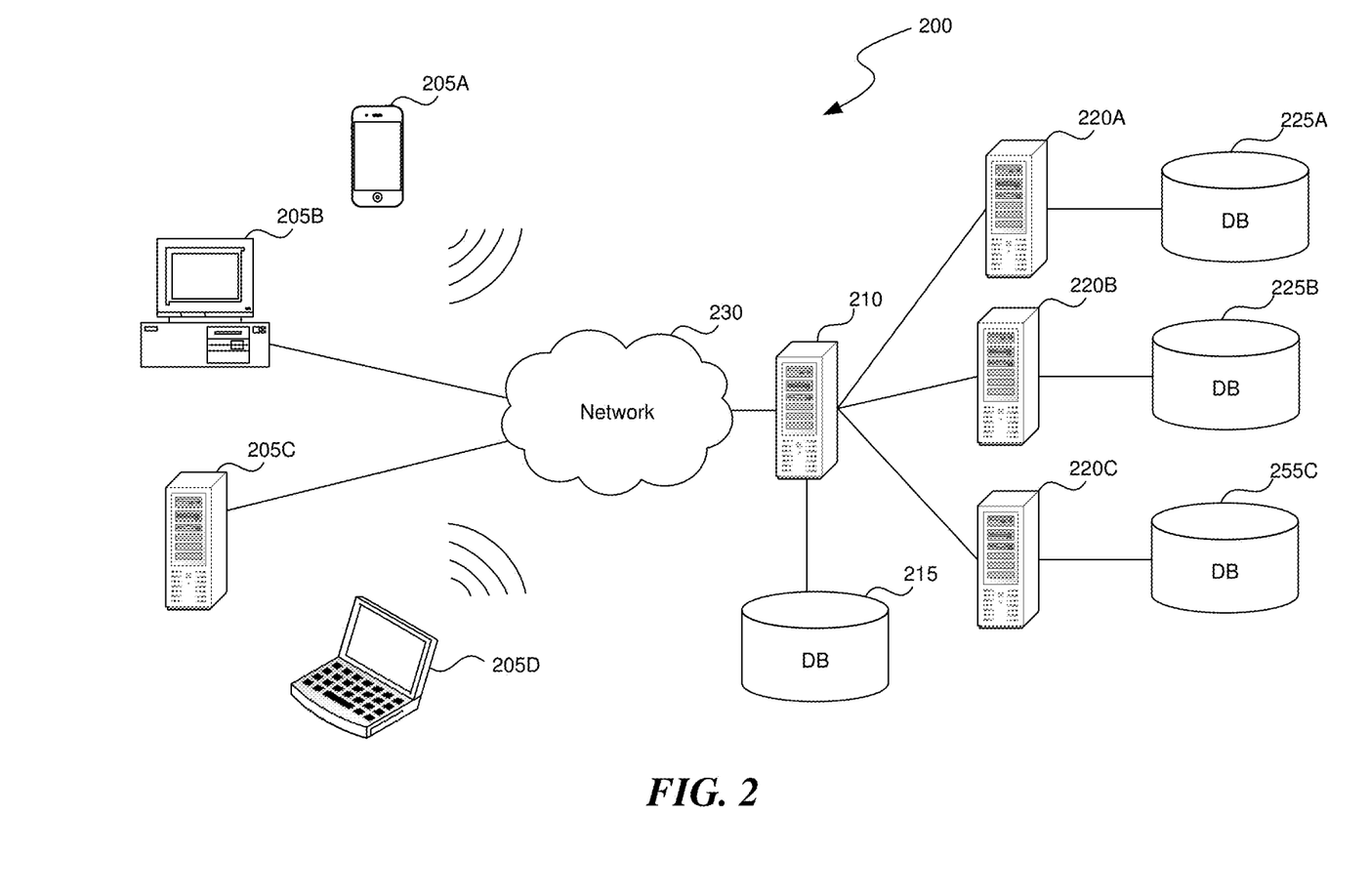
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as test results, monitored state data, historic monitored state data, rules, thresholds, and the like. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
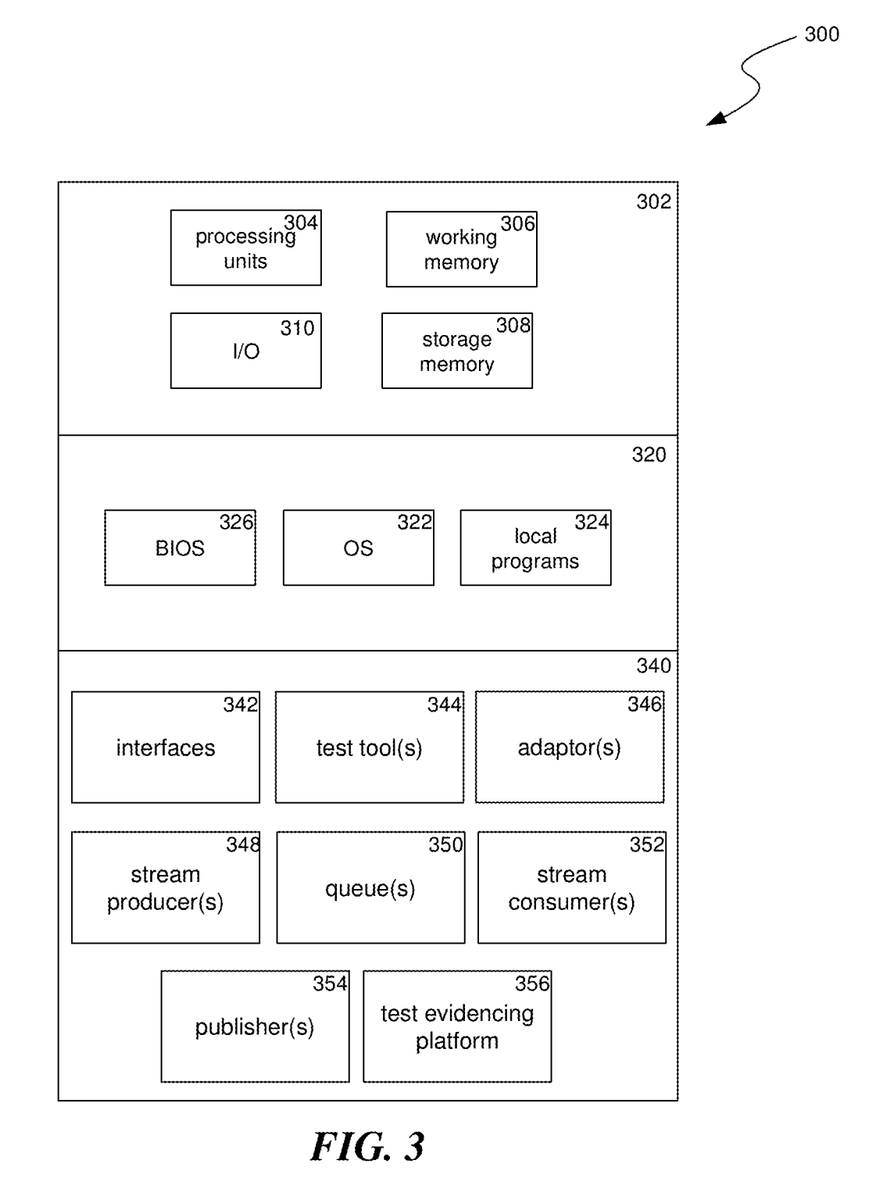
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g., CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include test tools 344, adaptors 346, stream producers 348, queues 350, stream consumers 352, publishers 354, test evidencing platform 356, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Test tools 344 can be any suitable tool for designing and implementing test cases for software products. For example, a test tool can define an interface for test code. In this example, the test code can implement a series of test cases which, when executed by the test tool, can perform the test cases (using a software under test) and log the results of the execution. Test tools 344 can be any suitable test tool for unit testing, integration testing, end-to-end testing, acceptance testing, or any other suitable software product testing. Test tools can output test results in any suitable format, such as JavaScript Object Notation ("JSON") files, Extensible Markup Language ("XML") file, JUnit report, and any other suitable format. Examples of test tools 344 include continuous integration/continuous development software development test tools, web browser test tools, artificial intelligence based user interface test tools, software security based test tools, test management frameworks (e.g., frameworks for management of testing pipelines), other suitable test automation tools, any components of these test tools, and other suitable test tools.

Adaptors 346 can be software for converting the output of test tools 344 to a universal format. For example, a variety of test tools 344 can be used by developers and because of this, test results may be generated in different formats. Adaptors 346 can be configured to ingest test results from one or more of test tools 344 and generate the test results in a universal format. In an example, one of test tools 344 may generate a JSON file with relevant test results using a first set of tags. One of adaptors 346 can be configured to ingest the JSON file, translate at least some of the first set of tags to a second set of tags, and output an XML file as a JUnit report. Other suitable test tools 344 can similarly interact with other suitable adaptors 346.

Stream producers 348, queues 350, and stream consumers 352 can be components that generate, store, and consume streams of data. For example, stream producers 348, queues 350, and stream consumers 352 can be elements of a Kafka ecosystem. In some implementations of a Kafka ecosystem, stream producers 348 can generate a stream of events and stream consumers 352 can subscribe to, and consume, these event streams. A Kafka ecosystem can also include stream processing elements, which can receive a stream of events for processing, such as transforming, re-packaging, analytics (e.g., pattern recognition), and the like. Each of Kafka producer elements, consumer elements, and stream processing elements can communicate with one another based on element specific application programming interfaces ("APIs").

In some implementations, stream producers 348 can implement Kafka topics that can be used to organize event streams and can further implement partitions that can used to further organize/structure these event streams. Stream consumers 352 and stream processing elements can subscribe to certain topics and/or partitions. Stream producers 348 can package data objects and generate a stream of data objects for a given topic and/or partition, and the data objects can be persistently stored in queues 350. Stream consumers 352 and/or other Kafka processing elements that subscribe to the given topic/partition can receive or retrieve queued data objects from queues 350 for further processing. Queues 350 can be dynamically scalable and persistently store the stream of data objects generated by stream producers 348.

In some implementations, stream producers 348 package test results into a stream of test results data objects that are queued by queues 350. Stream consumers 352 can receive or retrieve test results data objects from queues 350 for publication. Publishers 354 can be code running in a cloud (e.g., virtual machine, pod, container, etc.) that takes the test results data objects retrieved from queues 350 by stream consumers 352 and publishes the test results contained in the data objects to test evidencing platform 356. For example, test evidencing platform 356 may be a framework for software product lifecycle management that includes a repository or database for quality assurance related data, such as software product release management, build management, module management, and other suitable software product lifecycle data.

In some implementations, test evidencing platform 356 includes interfaces, such as an API, for publishing test results to the framework. Publishers 354 can package the test results contained in a test results data object (retrieved from one of queues 350) and make an API call for publication to test evidencing platform 356. In some implementations, test evidencing platform 356 can include its own cloud computing resources for receiving test results for publication (e.g., based on API calls received) and updating its internal databases/repositories. Accordingly, the publication rate (e.g., test results successfully published over time) to test evidencing platform 356 can be based on its available computing resources (e.g., externally managed cloud computing resources).

Implementations can dynamically scale components of the test publication framework, such as stream producers 348, queues 350, stream consumers 352, and publishers 354. For example, the state of the test publication framework can be observed (e.g., queues 350 size, a rate of change in queues 350 size, rate at which test results are pushed to stream producers 348, rate at which publishers 354 successfully publish test results, and other suitable observed states) and one or more of these components can be dynamically scaled up or down (e.g., when the observed state of the test publication framework exceeds a corresponding threshold). For example, queues 350 can be dynamically scalable based on different rates observed, such as the rate at which test results are pushed to stream producers 348, the rate at which publishers 354 successfully publish test results, a combination of these, or other suitable test publication framework states or observed rates.

In some implementations, the computing resources for test evidencing platform 356 may be externally managed. Accordingly, the test results publication rate to test evidencing platform 356 can be observed (e.g., based on API calls and successful/unsuccessful messages received about the API calls), however because the computing resources are externally managed, they may not be available for dynamic scaling (e.g., based on the state of the dynamic test publication framework). Some implementations can dynamically scale components of the dynamic test publication framework based on the observed publication rate to test evidencing platform 356 and/or changes to the observed publication rate to manage the flow of data within the dynamic test publication framework.

Figure 4:
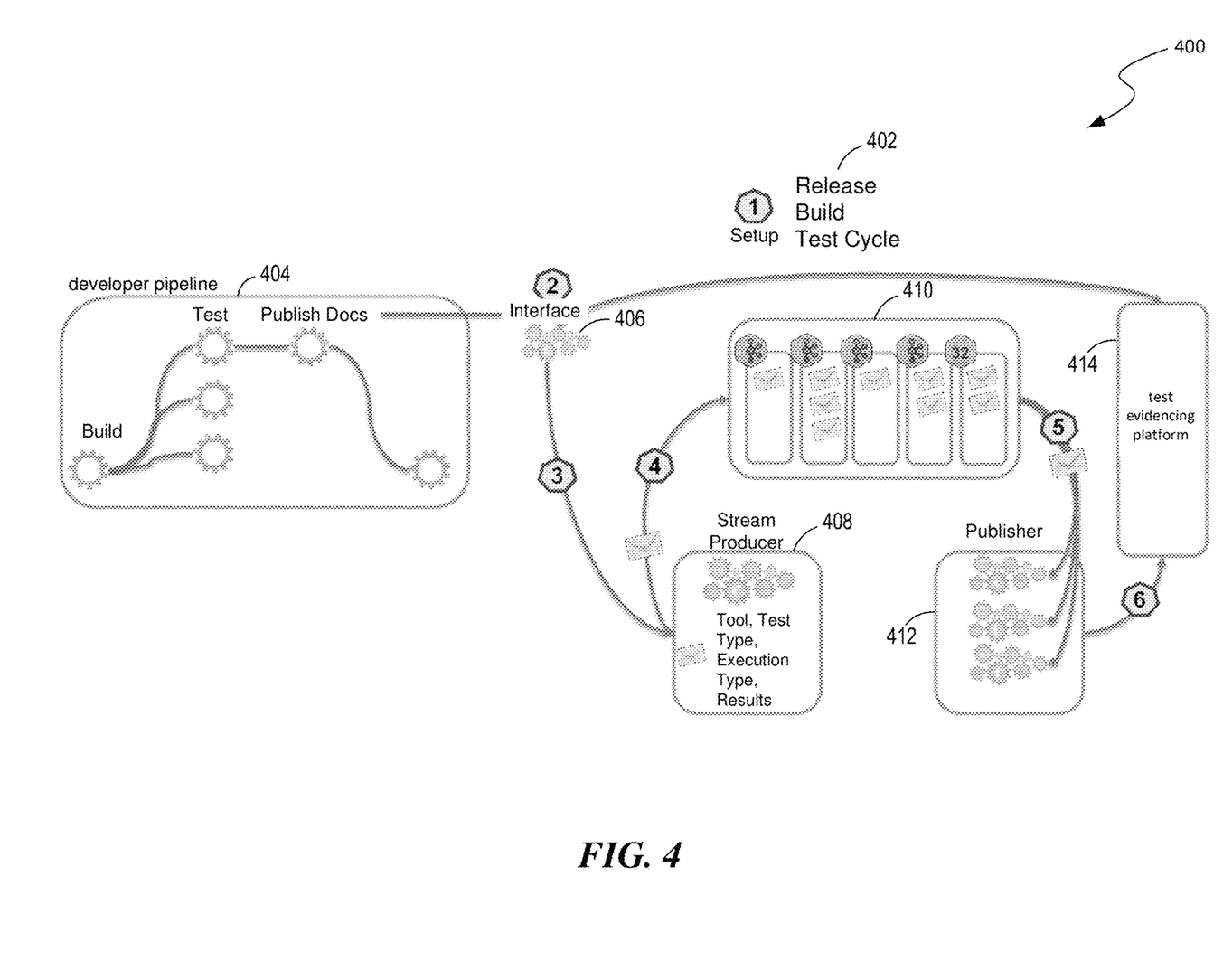
FIG. 4 is a system diagram illustrating components of a dynamic test publication framework for software development updates.

FIG. 4 is a system diagram illustrating components of a dynamic test publication framework for software development updates. System 400 includes setup transaction 402, developer pipeline 404, interface 406, stream producer 408, queue 410, publisher 412, and test evidencing platform 414. For initialization, setup transaction 402 can trigger an initialization process within test evidencing platform 414. For example, test evidencing platform 414 can be a software test case management environment, and setup transaction 402 can initialize a software release, build, and test cycle for a software product.

After initialization, a software build can be developed, and the developed build can be tested at developer pipeline 404. For example, developer pipeline 404 can be a continues development/continuous integration devoper environment or any other suitable developer pipeline (e.g., on-premise or cloud based test environment). A series of tests can be performed at developer pipeline 404, for example using any suitable test tool. In some implementations, execution of the tests by the test tool generates test results, and an adapter ingests the test results and converts them into a universal format (e.g., JUnit format).

Once test results are available for the software build, they can be pushed to stream producer 408 using interface 406. For example, interface 406 can be code that resides at developer pipeline 404 that pushes the test results to stream producer 408 when one or more tests are completed (e.g., when the series of tests have been run). In another example, interface 406 can be an API that is called from developer pipeline 404. In some implementations, a user calls, runs, or otherwise triggers interface 406 to push the tests results to stream producer 408 once a segment of testing is completed.

Stream producer 408 can package received test results and other information relevant to the test results (e.g., test tool, test type, execution type, software build, etc.) into test results data objects and build a stream of these test results data objects. For example, stream producer 408 can be a Kafka stream producer that streams test results data objects using a topic and/or partitions. Queue 410 can persistently store the test results data objects built by stream producer 408 and dynamically change size based on one or more scaling conditions.

Publisher 412 can be a stream consumer that retrieves test results data objects from queue 410 and publishes the test results (and other information relevant to the test results) contained in the retrieved data object to test evidencing platform 414. For example, publisher 412 can include a Kafka stream consumer that retrieves or receives test results data objects from queue 410. Publisher 412 can also include a publishing component or code that packages the test results (and other information relevant to the test results) and executes an API call (or other suitable interface) to publish the test results to the test evidencing platform 414.

In some implementations, components of system 400 can be dynamically scalable based on the state of the system, such as stream producer 408, queue 410, and/or publisher 412. For example, stream producer 408 can be code that runs in a cloud environment (e.g., virtual machine, pod, container, etc.). Based on scaling conditions for stream producer 408, additional instances of stream producer 408 can be initialized, thereby scaling up to increase throughput or instances of stream producer 408 can be uninitialized, thereby scaling down. In another example, publisher 412 can be code that runs in a cloud environment (e.g., virtual machine, pod, container, etc.). Based on scaling conditions for publisher 412, additional instances of publisher 412 can be initialized, thereby scaling up to increase throughput or instances of publisher 412 can be uninitialized, thereby scaling down.

In some implementations, queue 410 can have its size dynamically increased or decreased based on scaling conditions for the queue. Scaling the queue size can include reserving additional memory (e.g., in a cloud environment) for queue 410 or releasing reserved memory for queue 410. Scaling conditions for queue 410 can be observed states of the dynamic test publication framework, such as the rate at which test results are pushed to stream producer 408, the rate at which publishers 412 successfully publish test results to test evidencing platform 414, the rate at which the queue size is increasing or decreasing, changes in these rates, overall queue size, or other suitable observed states, which can be analyzed according to one or more rules, algorithms, or a machine learning model to trigger scaling actions.

In some implementations, the test evidencing platform 414 may be a testing environment with externally managed cloud resources. For example, a test environment's cloud resources may be managed separate from the other components of system 400 (e.g., the dynamic test publication framework). In this example, while other components of system 400 (e.g., stream producer 408, queue 410, and/or publisher 412) can be dynamically scaled based on the status of the dynamic test publication framework, the managed cloud resources of test evidencing platform 414 are not scaled based on the dynamic test publication framework. In other words, because the test evidencing platform 414 and the scalable components of system 400 are managed by different entities in this example, the cloud resources of the test evidencing platform 414 are not scalable along with the components of system 400.

In some implementations, the scalable components of system 400 may be scaled based on observed indicators from test evidencing platform 414. For example, publishers 412 can use an interface to publish tests results to test evidencing platform 414, and the rate at which test results are successfully published (e.g., based on a received message that indicates success) can indicate the current cloud resource availability at test evidencing platform 414. In some implementations, the successful publication rate can be a scaling condition for one or more of stream producer 408, queue 410, and/or publisher 412.

In some implementations, stream producer 408 can be scaled according to scaling conditions and one or more rules, algorithms, or a machine learning model trained to scale the component. For example, scaling conditions for stream producer 408 can be: a rate at which interface 406 transmits test results (or test results are otherwise received at stream producer 408), queue 410 size or changes in queue size, conditions at test evidencing platform 414 (e.g., a number of initialized software product releases open at a given time, such as initialized using setup transaction 402), processor utilization (or another suitable utilization metric) for the virtual machine(s) (e.g., container, pod, etc.) that implements stream producer 408, and other suitable scaling conditions.

In some implementations, rules can be setup to scale stream producer 408 based on one or more of the scaling conditions. For example, a default number of instances of stream producer 408 may be running in normal operating conditions. An example rule for scaling can be: when queue 410 size meets or exceeds a threshold or a rate of growth of queue size meets or exceeds a rate threshold, dynamically scale up stream producer 408 by adding one or more instances. Another example rule can be: when a number of initialized software product releases open at a given time meets or exceeds a threshold, increase the default number of instances of stream producer 408 by one until the number of open initialized software product releases falls below the threshold. In this example, an open product release can be a product build release with an open state (e.g., build under test, build not yet pushed to production, etc.). The state for the product release can be maintained in a project management system, at test evidencing platform 414, or in any other suitable manner.

In some implementations, one or more algorithms can be defined that dynamically scale stream producer 408. An example representative algorithm can be: queue_State*X+init_Releases*Y>=Thresholds, where queue_State is the size of the queue (or rate of change in size), init_Releases is the number of open software releases initialized, X is a weight factor for queue_State, Y is a weight factor for init_Releases, and Thresholds is a set of thresholds that correspond to scaling actions. In this example, when a first threshold is exceeded the default number of stream producer 408 instances may be scaled by one, and when a second threshold is exceeded the default number of stream producer 408 instances may be scaled by two. Further, if the default number is scaled by two and conditions change in the future such that the second threshold is no longer exceeded (but this first threshold is exceeded), the number of instances of stream producer 408 may be dynamically reduced by one (leaving the number at default+1).

In some implementations, historic data about the state of the dynamic test publication framework and/or the test evidencing platform 414 can be stored and the historic data can be used to train a machine learning model. For example, historic data about open software releases can be stored in association with observed states for the components of system 400 (e.g., rate at which test results are received at stream producer 408, queue 410 size or rate of size change, publication rate by publishers 412, and other suitable states). The historic data about the open software releases can be used to generate training data for a machine learning model. For example, an instance of training data can relate to a historic software release and can include information such as software product identification, age of the software product (or other lifecycle information), type of software update/change, observed test types performed for the software release, observed number of tests performed for the software release, time the software release was in an open state, and other suitable information.

In some implementations, the historic data used to train a machine learning model can also include load on components of system 400. For example, load can relate to processor utilization, storage utilization, or another suitable load metric for a virtual machine that implements stream producer 408, queue 410, and/or publishers 412. The historic data can include observations where a component of system 400 became overloaded (or failed) given observed states for the components of system 400 (e.g., rate at which test results are received at stream producer 408, queue 410 size or rate of size change, publication rate by publishers 412, and other suitable states). In this example, thresholds for dynamically scaling stream producer 408 (e.g., size thresholds for queue 410, rate of growth thresholds for queue 410, a threshold for the number of initialized software product releases open at a given time, thresholds in a scaling algorithm, etc.) can be learned based on load observations in the historic data.

In some implementations, the machine learning model can be trained to predict a future load on the dynamic test publication framework using the training data. For example, the machine learning model can take, as input, the state of open software releases at test evidencing platform 414 and output a predicted future rate of test results for publication. The predicted future rate can be used to dynamically scale stream producer 408, change the default number of instances of stream producer 408 (e.g., for a period of time), or otherwise scale components of system 400.

In some implementations, queue 410 can be scaled according to scaling conditions and one or more rules, algorithms, or a machine learning model trained to scale the component. For example, scaling conditions for queue 410 can be: a rate at which test results are received at stream producer 408, queue 410 size or changes in queue size, a rate at which publishers 412 successfully publishes test results, conditions at test evidencing platform 414 (e.g., a number of initialized software product releases open at a given time, such as initialized using setup transaction 402), and other suitable scaling conditions.

In some implementations, rules can be setup to scale queue 410 based on one or more of the scaling conditions. For example, a default size for queue 410 may be implemented in normal operating conditions. An example rule for scaling can be: when queue 410 size meets or exceeds a threshold or a rate of growth of queue size meets or exceeds a rate threshold, dynamically scale up queue 410 by reserving a predetermined chunk of additional storage resources. Another example rule can be: when a number of initialized software product releases open at a given time meets or exceeds a threshold, increase the default size of queue 410 (e.g., by a predetermined amount) until the number of open initialized software product releases falls below the threshold. In this example, an open product release can be a product build release with an open state (e.g., build under test, build not yet pushed to production, etc.). Yet another example rule can be: when a successful publication rate by publishers 412 is below a threshold, dynamically scale up queue 410 by reserving a predetermined chunk of additional storage resources. In this example, because limited throughput is observed for publishers 412, queue 410 may experience fast growth, and thus additional storage resources may be needed to ensure queue 410 is not overloaded.

In some implementations, one or more algorithms can be defined that dynamically scale queue 410. An example representative algorithm can be: queue_State*X+init_Releases*Y>=Thresholds, where queue_State is the size of the queue (or rate of change in size), init_Releases is the number of open software releases initialized, X is a weight factor for queue_State, Y is a weight factor for init_Releases, and Thresholds is a set of thresholds that correspond to scaling actions. In this example, when a first threshold is exceeded the default size of queue 410 may be scaled up by a first predetermined quantity, and when a second threshold is exceeded the default size of queue 410 may be scaled up by a second predetermined quantity. Further, if the default size of queue 410 is scaled by the second predetermined quantity and conditions change in the future such that the second threshold is no longer exceeded (but this first threshold is exceeded), the size of queue 410 may be reduced (leaving the size at default size+first predetermined quantity).

In some implementations, historic data about the state of the dynamic test publication framework and/or the test evidencing platform can be stored and the historic data can be used to train a machine learning model. For example, historic data about open software releases can be stored in association with observed states for the components of system 400 (e.g., rate at which test results are received at stream producer 408, queue 410 size or rate of size change, publication rate by publishers 412, and other suitable states). In some implementations, the machine learning model can be trained to predict a future load on the dynamic test publication framework using the training data. For example, the machine learning model can take, as input, the state of open software releases at test evidencing platform 414 and output a predicted future rate of test results for publication. The predicted future rate can be used to dynamically scale queue size 410, change the default size for queue 410 (e.g., for a period of time), or otherwise scale components of system 400.

In some implementations, the historic data used to train a machine learning model can also include load on components of system 400. For example, load can relate to processor utilization, storage utilization, or another suitable load metric for a virtual machine that implements stream producer 408, queue 410, and/or publishers 412. The historic data can include observations where a component of system 400 became overloaded (or failed) given observed states for the components of system 400 (e.g., rate at which test results are received at stream producer 408, queue 410 size or rate of size change, publication rate by publishers 412, and other suitable states). In this example, thresholds for dynamically scaling queue 410 (e.g., size thresholds for queue 410, rate of growth thresholds for queue 410, a threshold for the number of initialized software product releases open at a given time, threshold for a successful publication rate by publishers 412, thresholds in a scaling algorithm, etc.) can be learned based on load observations in the historic data.

In some implementations, publisher 412 be scaled according to scaling conditions and one or more rules, algorithms, or a machine learning model trained to scale the component. For example, scaling conditions for publisher 412 can be: a rate at which test results are received at stream producer 408, queue 410 size or changes in queue size, a rate at which publishers 412 successfully publishes test results, conditions at test evidencing platform 414 (e.g., a number of initialized software product releases open at a given time, such as initialized using setup transaction 402), processor utilization (or another suitable utilization metric) for the virtual machine(s) (e.g., container, pod, etc.) that implements publisher 412, and other suitable scaling conditions.

In some implementations, rules can be setup to scale publisher 412 based on one or more of the scaling conditions. For example, a default number of instances of publisher 412 may be running in normal operating conditions. An example rule for scaling can be: when queue 410 size meets or exceeds a threshold or a rate of growth of queue size meets or exceeds a rate threshold AND an observed successful publication rate for publishers 412 is above a throttling threshold, dynamically scale up publisher 412 by adding one or more instances. In this example, scaling up publishers 412 may overload the dynamic test publication framework if the successful publication rate of publishers 412 is limited. Accordingly, the throttling threshold can be used to ensure publishers 412 are not scaled until test evidencing platform 414 has resources available to process the publications from publishers 412.

Another example rule can be: when a number of initialized software product releases open at a given time meets or exceeds a threshold, increase the default number of instances of publisher 412 by one (or more) until the number of open initialized software product releases falls below the threshold. Yet another example rule can be: when a successful publication rate by publisher 412 is above a threshold, dynamically scale up publisher 412 by adding one or more instances. In this example, when increased throughput is observed for publisher 412 (e.g., due to increased throughput observed for test evidencing platform 414), publisher 412 can be scaled to take advantage of the throughput opportunity presented and/or to clear queue 410 (which may have grown due to the limited throughput in the recent past).

In some implementations, one or more algorithms can be defined that dynamically scale publisher 412. An example representative algorithm can be: queue_State*X+ pub_Rate*Y>=Thresholds, where queue_State is the size of the queue (or rate of change in size), pub_Rate is the observed successful publication rate for publishers 412 (e.g., which is a function of the resource availability at test evidencing platform 414), X is a weight factor for queue_State, Y is a weight factor for pub_Rate, and Thresholds is a set of thresholds that correspond to scaling actions. In this example, when a first threshold is exceeded the default number of publisher 412 instances may be scaled by one, and when a second threshold is exceeded the default number of publisher 412 instances may be scaled by two. Further, if the default number is scaled by two and conditions change in the future such that the second threshold is no longer exceeded (but this first threshold is exceeded), the number of instances of publisher 412 may be reduced by one (leaving the number at default+1).

In some implementations, historic data about the state of the dynamic test publication framework and/or the test evidencing platform can be stored and the historic data can be used to train a machine learning model. For example, historic data about open software releases can be stored in association with observed states for the components of system 400 (e.g., rate at which test results are received at stream producer 408, queue 410 size or rate of size change, publication rate by publishers 412, and other suitable states). The historic data about the open software releases can be used to generate training data for a machine learning model.

In some implementations, the machine learning model can be trained to predict a future load on the dynamic test publication framework using the training data. For example, the machine learning model can take, as input, the state of open software releases at test evidencing platform 414 and output a predicted future rate of test results for publication. The predicted future rate can be used to dynamically scale publisher 412, change the default number of instances of publisher 412 (e.g., for a period of time), or otherwise scale components of system 400.

In some implementations, the historic data used to train a machine learning model can also include load on components of system 400. For example, load can relate to processor utilization, storage utilization, or another suitable load metric for a virtual machine that implements stream producer 408, queue 410, and/or publishers 412. The historic data can include observations where a component of system 400 became overloaded (or failed) given observed states for the components of system 400 (e.g., rate at which test results are received at stream producer 408, queue 410 size or rate of size change, publication rate by publishers 412, and other suitable states). In this example, thresholds for dynamically scaling publishers 412 (e.g., size thresholds for queue 410, rate of growth thresholds for queue 410, a threshold for the number of initialized software product releases open at a given time, thresholds for a successful publication rate by publishers 412, thresholds in a scaling algorithm, etc.) can be learned based on load observations in the historic data.

A "machine learning model," as used herein, refers to a construct that is trained using training data to make predictions or provide probabilities for new data items, whether the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, embodiments of machine learning models can be neural networks with multiple input nodes that receive relevant pieces of observed states for components of the dynamic test publication framework. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, can be used to predict a future rate of tests received by the framework, predict a future load on components of the dynamic test publication framework, and/or predict scaling conditions for components of the dynamic test publication framework. In some implementations, some neural networks, known as deep neural networks, can have multiple layers of intermediate nodes with different configurations, can be a combination of models that receive different parts of the input and/or input from other parts of the deep neural network, or are convolutions or recurrent-partially using output from previous iterations of applying the model as further input to produce results for the current input.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
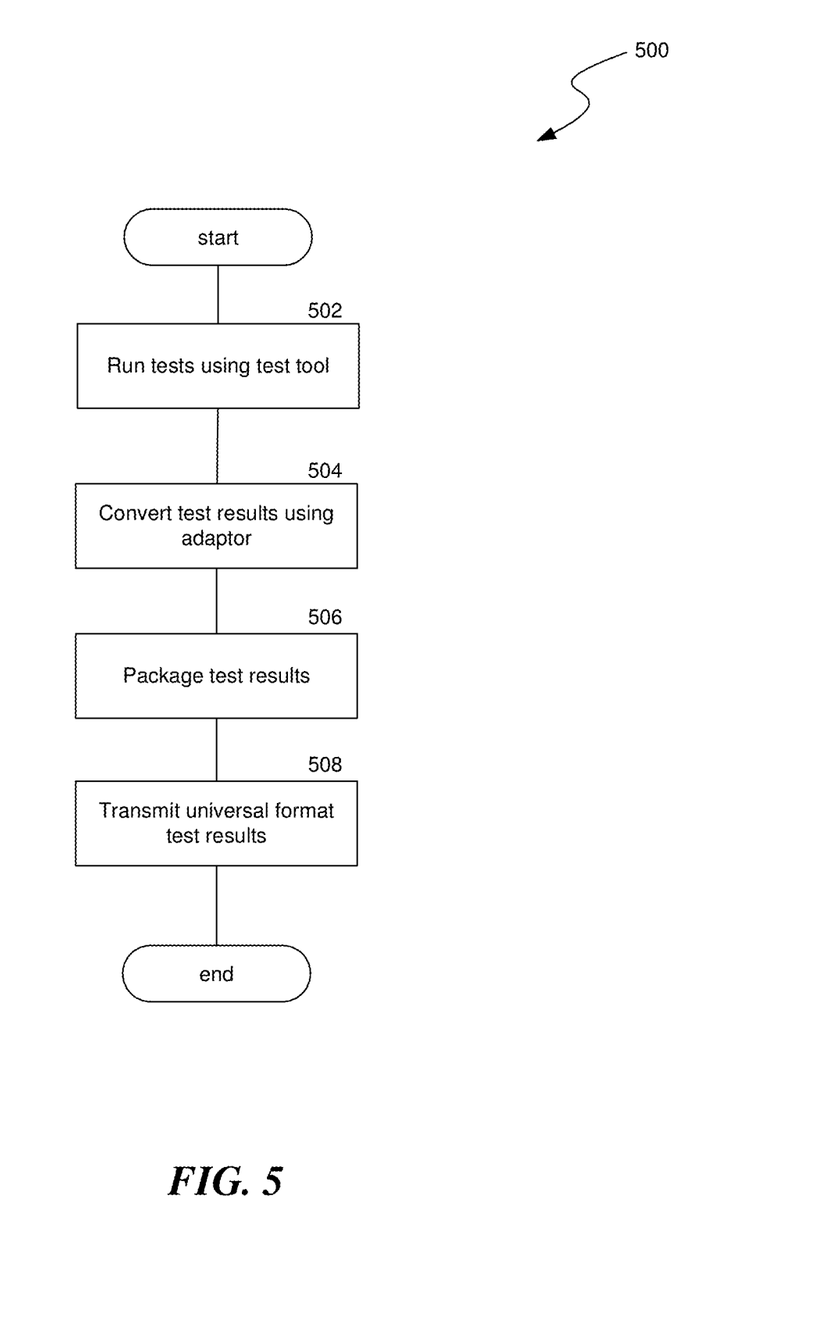
FIG. 5 is a flow diagram illustrating a process used in some implementations for performing software testing using a test tool.

FIG. 5 is a flow diagram illustrating a process 500 used in some implementations for performing software testing using a test tool. In some implementations, process 500 is performed for a software build in a test environment. Process 500 can be triggered by a project management status update for a software product, such as an update that indicates a software build is ready for test.

At block 502, process 500 can run tests using a test tool. For example, a series of test cases can be designed for a software build that test updates in the software build. In some implementations, a variety of test tools can be used to design and/or run the tests. For example, a sequence of fifty test cases can be designed, and the test tool can run the test cases using the software build (e.g., software under test) and output tests results (e.g., a log associated with each test case). A given software build can be tested using different test tools that output test results in different formats.

At block 504, process 500 can convert test results using a configured adaptor. For example, test results can be converted to a universal format (e.g., JUnit format) so that they can be ingested by the dynamic test publication framework. An adaptor can be configured (for an individual test tool) that can ingest test results in a first format (e.g., JSON) and output the test results in the universal format. In some implementations, two different test tools are used to perform tests at block 502, where the first test tool outputs test results in the universal format and the second test tool outputs test results in a different format. In this example, an adaptor can be configured to ingest test results from the second test tool and convert the different format to the universal format.

At block 506, process 500 can package test results. For example, test results from multiple test runs can be packaged together. In another example, test results from multiple test tools can be packaged together. In some implementations, packaging the test results can include providing additional information with the test results, such as the test tool used, test type, execution time, test duration, and other suitable information.

At block 506, process 500 can transmit the packaged test results to the dynamic test publication framework. For example, the packaged test results can be transmitted from a computing device of the test environment to a computing device of the dynamic test publication framework. In some implementations, an interface for the dynamic test publication framework (e.g., API, code resident in the test environment) can be used to transmit the packaged test results.

Figure 6:
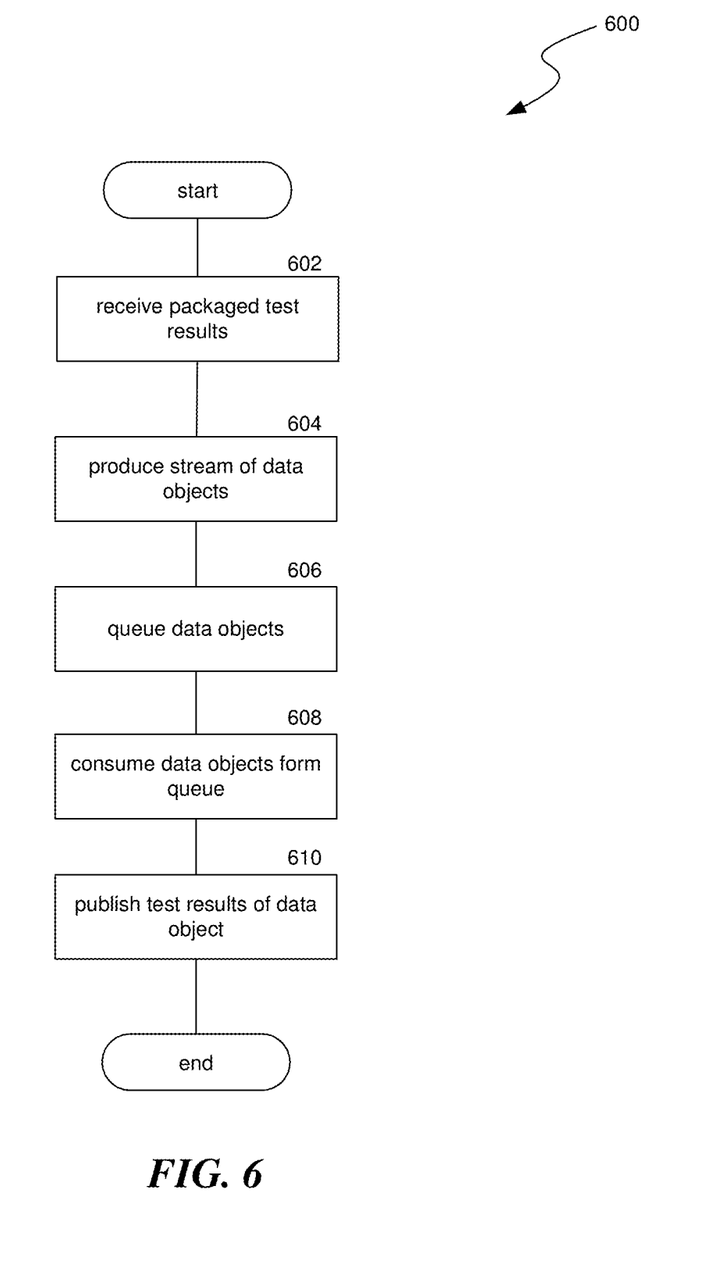
FIG. 6 is a flow diagram illustrating a process used in some implementations for implementing software development updates using dynamic test publishing.

FIG. 6 is a flow diagram illustrating a process 600 used in some implementations for software development updates using dynamic test publishing. In some implementations, process 600 is performed for a software build at the dynamic test publication framework. Process 600 can be triggered when a software release (e.g., build release) is initialized at a test evidencing platform and when test results are received at the dynamic test publication framework.

At block 602, process 600 can received a package of tests results. For example, tests for a software build can be performed in a test environment, and a package of the test results can be received from a computing device of the test environment. The package of test results can include additional information about the software build and/or test results, such as the test tool used, test type, execution time, test duration, and other suitable information.

At block 604, process 600 can produce a stream of test results data objects. For example, several packaged tests results can be received (e.g., over a period of time) and data from the packaged test results can be used to generate test results data objects. A stream (e.g., real-time stream) of test results data objects can be built using a producer component (e.g., a Kafka stream producer). The stream of test results data objects can be organized according to topic and/or partition. In some implementations, the producer component can be an instance of software executing in the cloud (e.g., a virtual machine, pod, container, etc.) and the instances of producer components can be dynamically scaled based on the state of the dynamic test publication framework, as discussed below in relation to FIG. 7.

At block 606, process 600 can queue the streamed test results data objects. For example, a queue (e.g., Kafka queue organized by topic and/or partition) can be used to store the streamed test results data objects (e.g., organized as a first-in-first-out queue). The queued test results data objects can each have a timestamp that indicates when it was queued. In some implementations, the queue can persistently store the test results data objects and can be dynamically scaled to increase or decrease the queue size (e.g., number of partitions or reserved memory).

At block 608, process 600 can consume the queued test results data objects. For example, a consumer component (e.g., Kafka consumer) can receive or retrieve queued test results data objects. The timestamp for a received or retrieved test results data objects can be used to determine a queue time and/or a queue rate. In some implementations, the consumer component can be an instance of software executing in the cloud (e.g., virtual machine, pod, container, etc.) and the instances of consumer components can be dynamically scaled based on the state of the dynamic test publication framework, as discussed below in relation to FIG. 7.

At block 610, process 600 can publish the test results data from the received test results data objects. For example, publishers at the test results publishing framework can use an interface of a test evidencing platform (e.g., API) to publish the test results data to the test evidencing platform. In some implementations, the test evidencing platform can receive the published test results data and perform internal operations to update databases, repositories, and/or other data structures based on the published test results. In some implementations, cloud resources for the test evidencing platform may be externally managed and are not available for dynamic scaling based on the state of the dynamic test publication framework. A success message may be received from the test evidencing platform when its internal components have been successfully updated with the test results for publication.

In some implementations, the consumer component and the publisher can be implemented as a single component, and the component (referred to simply as the publisher) can be an instance of software executing in the cloud (e.g., virtual machine, pod, container, etc.). The instances of publishers can be dynamically scaled based on the state of the dynamic test publication framework, as discussed below in relation to FIG. 7.

Implementations of the dynamic test publication framework can process large-scale test results. For example, the publishers can achieve a successful publication rate of 10,000 tests results per hour, and in some implementations can exceed 10,000 test results per hour.

Figure 7:
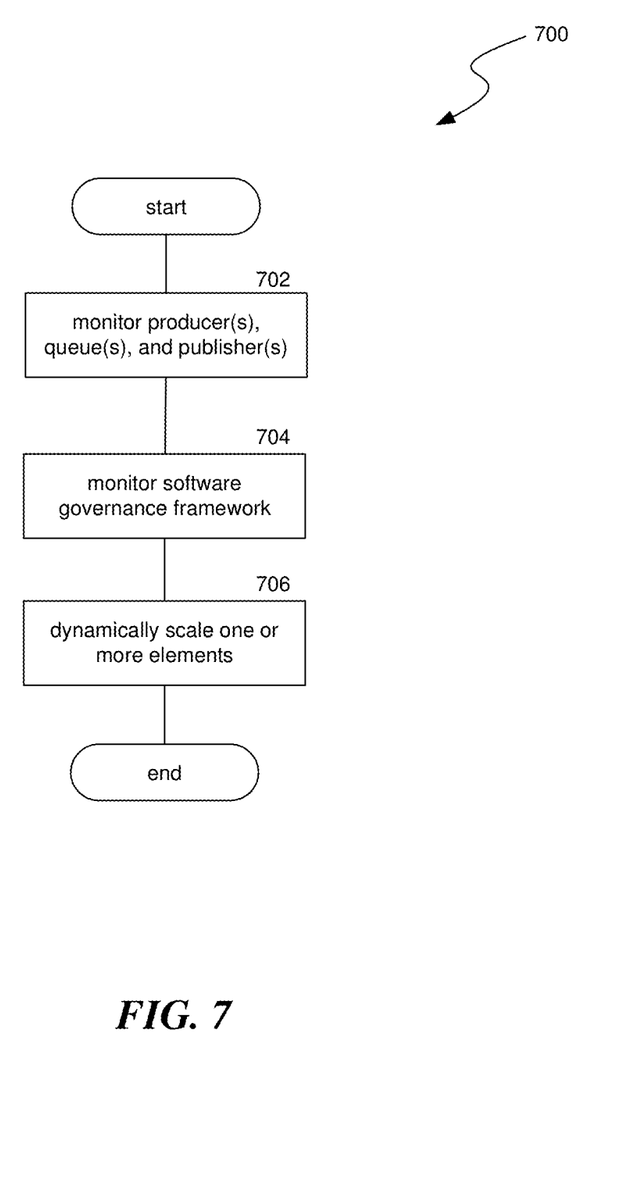
FIG. 7 is a flow diagram illustrating a process used in some implementations for dynamically scaling components of a dynamic test publication framework.

FIG. 7 is a flow diagram illustrating a process 700 used in some implementations for dynamically scaling components of a dynamic test publication framework. In some implementations, process 700 is performed for a software build at the dynamic test publication framework. Process 700 can be triggered when a software release (e.g., build release) is initialized at a test evidencing platform and when test results are received at the dynamic test publication framework.

At block 702, process 700 can monitor the producer component(s), queue(s), and publisher(s) of the dynamic test publication framework. For example, the monitored states of these components can include: the rate at which test results are received at the producer component(s), the rate at which producer component(s) stream test results data objects, the size of the queue(s), the change in size of the queue(s) over time, the rate at which publisher(s) receive test results data objects from the queue(s), the rate at which publisher(s) successfully publish test results to the test evidencing platform, and other suitable states.

At block 704, process 700 can monitor the test evidencing platform. For example, the monitored states of the test evidencing platform can include: the number of open/initialized software releases (including specific information about these open releases), the rate at which the test evidencing platform is able to process test results received from the publisher(s), and other suitable states.

At block 706, process 700 can dynamically scale one or more components of the dynamic test publication framework. For example, one or more of the producer component(s), queue(s), and/or publisher(s) can be dynamically scaled based on the monitored states. The monitored states can be compared to thresholds and scaling actions can be taken based on the comparisons.

In an example, a publish rate at which publisher(s) successfully publish test results to the test evidencing platform can be compared to a first threshold and a second threshold. If the publish rate exceeds the first threshold, the number of publisher(s) can be dynamically scaled up. A high publish rate can indicate that test evidencing platform has available resources to process publications. In another example, if the publish rate falls below the second threshold, the number of publisher(s) can be dynamically scaled down and/or the queue(s) size can be dynamically increased. For example, a low publish rate indicates that the dynamic test publication framework may experience a high number of pending test results, and these should be maintained in the queue(s). In the scenario where publisher(s) remain scaled up while the publication rate remains low, attempted publication transactions (e.g., at the test evidencing platform) may time out and the persistent storage of test results may be at risk. Because persistent storage is available at the queue(s), dynamically scaling down the publisher(s) and dynamically scaling up the queue(s) size can mitigate the risk of losing test results (e.g., failing to persistently store test results) due to timed out transactions.

In another example, the monitored queue(s) size can be compared to a threshold and the number of publisher(s) can be dynamically scaled up when the queue size meets or exceeds the threshold. In this example, dynamically scaling up the number of publisher(s) can reduce the queue size. However, the number of publisher(s) can also be dependent on the publish rate. In a further example, the monitored queue(s) size can be compared to a threshold and the number of publisher(s) can be dynamically scaled up when the queue size meets or exceeds the threshold AND the publish rate meets or exceeds a scaling threshold. For example, the scaling threshold may indicate that the publish rate can support increased publisher(s).

In some implementations, historic data about the state of the dynamic test publication framework and/or the test evidencing platform can be stored and the historic data can be used to train a machine learning model. For example, historic data about open software releases can be stored in association with observed states for the producer(s), queue(s), publisher(s) and the test evidencing platform (e.g., rate at which test results are received at the producer(s), queue size or rate of size change, publication rate, and other suitable states). The historic data about the open software releases can be used to generate training data for a machine learning model. For example, an instance of training data can relate to a historic software release and can include information such as software product identification, age of the software product (or other lifecycle information), type of software update/change, observed test types performed for the software release, observed number of tests performed for the software release, time the software release was in an open state, and other suitable information.

In some implementations, the machine learning model can be trained to predict a future load on the dynamic test publication framework using the training data. For example, the machine learning model can take, as input, the state of open software releases at the test evidencing platform and output a predicted future rate of test results for publication. The predicted future rate can be used to dynamically scale producer(s), queue(s), and/or publisher(s), change the default number of instances of producer(s), queue(s), and/or publisher(s) (e.g., for a period of time), or otherwise scale components of the dynamic test publication framework.

In some implementations, the historic data used to train a machine learning model can also include load on components of the dynamic test publication framework. For example, load can relate to processor utilization, storage utilization, or another suitable load metric for a virtual machine that implements stream producer(s), queue(s), and/or publisher(s). The historic data can include observations where a component of the dynamic test publication framework became overloaded (or failed) given observed states for the components (e.g., rate at which test results are received at stream producer(s), queue size or rate of size change, publication rate by publisher(s), and other suitable states). In this example, thresholds for dynamically scaling stream producer(s), queue(s), and/or publisher(s) can be learned based on load observations in the historic data.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for implementing software development updates using dynamic test publishing, the method comprising:
   receiving test results from a plurality of software tests run by one or more test tools, wherein the test results are converted to a tool agnostic format by one or more adaptors;
   generating, by one or more producer elements, a stream of test results data objects using the received test results;
   queuing the stream of test results data objects in one or more queues;
   publishing, by one or more publisher elements, test results contained in the queued test results data objects to a test evidencing platform using an application programming interface of the test evidencing platform, wherein the published test results are part of a software update for a software product;
   predicting, by a trained machine learning model, one or more scaling thresholds,
      wherein the trained machine learning model is trained via training data comprising observed states that caused overload conditions, and
      wherein the predicted one or more scaling thresholds comprise one or more of: a publishing rate threshold with respect to test results published by the publisher elements to the test evidencing platform, a queue size rate of change threshold, a threshold for a number of software product updates open at a given time, or any combination thereof;
   monitoring a state of one or more of the producer elements, queues, publisher elements, test evidencing platform, or a combination thereof; and
   dynamically scaling, based on comparing the monitored state to the one or more scaling thresholds, one or more of: a number of producer elements, a size of the one or more queues, a number of publisher elements, or a combination thereof.

2. The method of claim 1, wherein the monitoring comprises monitoring a publish rate at which the publisher elements successfully publish test results to the test evidencing platform.

3. The method of claim 2, wherein the dynamically scaling comprises dynamically scaling up the number of publisher elements when the publish rate meets or exceeds the one or more scaling thresholds.

4. The method of claim 2, wherein the dynamically scaling comprises dynamically scaling up the size of the one or more queues when the publish rate meets or exceeds the one or more scaling thresholds.

5. The method of claim 2, wherein the publish rate is at or above 10,000 tests results per hour.

6. The method of claim 1, wherein the training data comprises historic data recording previous software updates, wherein the historic data includes previous software updates and an observed quantity of tests published to the test evidencing platform for the previous software updates.

7. The method of claim 1, wherein the one or more queues persistently store the test results data objects until the test results data objects are received by the publisher elements.

8. The method of claim 1, wherein the producer elements comprise Kafka producer elements that stream the test results data objects in real-time, the one or more queues are organized as a Kafka topic, and the dynamically scaling of the one or more queues comprises scaling partitions for the Kafka topic.

9. The method of claim 1, wherein the publishers iteratively receive queued test results data objects from the one or more queues and iteratively publish the test results contained in the received test results data objects.

10. The method of claim 1,
   wherein the one or more scaling thresholds comprise the queue size rate of change threshold and/or the publishing rate threshold,
   wherein the monitored state compared to the one or more scaling thresholds comprises a monitored rate at which test results are received at the one or more producer elements and/or a monitored rate of change of queue size of the one or more queues, and
   wherein the number of publisher elements is dynamically scaled up based on the comparing the monitored state to the one or more scaling thresholds.

11. The method of claim 1, wherein the monitored state compared to the one or more scaling thresholds comprises a processor utilization and/or storage utilization for one or more virtual machines the implement the one or more producer elements, the one or more queues, and/or or the one or more publisher elements.

12. The method of claim 1,
   wherein the one or more scaling thresholds comprise the publishing rate threshold and/or the threshold for the number of software product updates open at a given time,
   wherein the monitored state compared to the one or more scaling thresholds comprises a publish rate at which the publisher elements successfully publish test results to the test evidencing platform, and wherein the number of publisher elements is dynamically scaled down and the size of the one or more queues is dynamically scaled up based on the comparing the monitored state to the one or more scaling thresholds.

13. The method of claim 1, wherein the publishing the test results to the test evidencing platform is part of executing one or more software updates to one or more computing systems.

14. A computer-readable storage medium storing instructions that, when executed by a computing system, cause the computing system to implement software development updates using dynamic test publishing, the process comprising:

receiving test results from a plurality of software tests run by one or more test tools, wherein the test results are converted to a tool agnostic format by one or more adaptors;

generating, by one or more producer elements, a stream of test results data objects using the received test results;

queuing the stream of test results data objects in one or more queues;

publishing, by one or more publisher elements, test results contained in the queued test results data objects to a test evidencing platform using an application programming interface of the test evidencing platform, wherein the published test results are part of a software update for a software product;

predicting, by a trained machine learning model, one or more scaling thresholds, wherein the trained machine learning model is trained via training data comprising observed states that caused overload conditions, and wherein the predicted one or more scaling thresholds comprise one or more of: a publishing rate threshold with respect to test results published by the publisher elements to the test evidencing platform, a queue size rate of change threshold, a threshold for a number of software product updates open at a given time, or any combination thereof;

monitoring a state of one or more of the producer elements, queues, publisher elements, test evidencing platform, or a combination thereof; and dynamically scaling, based on comparing the monitored state to the one or more scaling thresholds, one or more of: a number of producer elements, a size of the one or more queues, a number of publisher elements, or a combination thereof.

15. The computer-readable storage medium of claim 14, wherein the monitoring comprises monitoring a publish rate at which the publisher elements successfully publish test results to the test evidencing platform.

16. The computer-readable storage medium of claim 15, wherein the dynamically scaling comprises dynamically scaling up the number of publisher elements when the publish rate meets or exceeds the one or more scaling thresholds.

17. The computer-readable storage medium of claim 15, wherein the dynamically scaling comprises dynamically scaling up the size of the one or more queues when the publish rate meets or exceeds the one or more scaling thresholds.

18. The computer-readable storage medium of claim 14, wherein the trained machine learning model is trained using historic data recording previous software updates, wherein the historic data includes previous software updates and an observed quantity of tests published to the test evidencing platform for the previous software updates.

19. The computer-readable storage medium of claim 14, wherein the one or more queues persistently store the test results data objects until the test results data objects are received by the publisher elements.

20. A computing system for implementing software development updates using dynamic test publishing, the system comprising:

one or more processors; and one or more memories storing instructions that, when executed by the one or more processors, cause the computing system to perform a process comprising:

receiving test results from a plurality of software tests run by one or more test tools, wherein the test results are converted to a tool agnostic format by one or more adaptors;

generating, by one or more producer elements, a stream of test results data objects using the received test results;

queuing the stream of test results data objects in one or more queues;

publishing, by one or more publisher elements, test results contained in the queued test results data objects to a test evidencing platform using an application programming interface of the test evidencing platform, wherein the published test results are part of a software update for a software product;

predicting, by a trained machine learning model, one or more scaling thresholds, wherein the trained machine learning model is trained via training data comprising observed states that caused overload conditions, and wherein the predicted one or more scaling thresholds comprise one or more of: a publishing rate threshold with respect to test results published by the publisher elements to the test evidencing platform, a queue size rate of change threshold, a threshold for a number of software product updates open at a given time, or any combination thereof;

monitoring a state of one or more of the producer elements, queues, publisher elements, test evidencing platform, or a combination thereof; and dynamically scaling, based on comparing the monitored state to the one or more scaling thresholds, one or more of: a number of producer elements, a size of the one or more queues, a number of consumer publisher elements, or a combination thereof.

* * * * *